United States Patent [19]
Hammon et al.

[11] Patent Number: 4,761,112
[45] Date of Patent: Aug. 2, 1988

[54] DEVICE FOR MOUNTING OF REMOTE CONTROL APPARATUSES

[75] Inventors: Wolfgang Hammon, Obertshausen; Wolfgang Theisen, Rodenbach; Klaus Wegner, Hanau, all of Fed. Rep. of Germany

[73] Assignee: Nukem GmbH, Hanau, Fed. Rep. of Germany

[21] Appl. No.: 67,439

[22] Filed: Jun. 29, 1987

Related U.S. Application Data

[63] Continuation-in-part of Ser. No. 924,159, Oct. 27, 1986, abandoned, which is a continuation of Ser. No. 871,133, Jun. 2, 1986, abandoned, which is a continuation of Ser. No. 770,373, Aug. 29, 1985, abandoned, which is a continuation of Ser. No. 422,179, Sep. 23, 1982, abandoned.

[30] Foreign Application Priority Data

Sep. 29, 1981 [DE] Fed. Rep. of Germany ....... 3138634

[51] Int. Cl.$^4$ ............................................. B66F 19/00
[52] U.S. Cl. .................................... 414/591; 414/732; 212/213; 212/221; 901/16; 901/30
[58] Field of Search ...................... 212/212, 213, 221; 414/744.4, 591, 732, 735; 901/16

[56] References Cited

U.S. PATENT DOCUMENTS

| 2,822,094 | 2/1958 | Greer | 901/16 X |
| 3,722,709 | 3/1973 | Buschmann | 212/212 X |
| 3,887,080 | 6/1975 | Wilson | 212/212 |
| 4,177,002 | 12/1979 | Motoda et al. | 414/751 |
| 4,346,808 | 8/1982 | Garlung et al. | 212/212 |
| 4,652,195 | 3/1987 | McArthur | 414/744 A |

FOREIGN PATENT DOCUMENTS

| 3508195 | 9/1986 | Fed. Rep. of Germany | 212/213 |
| 459502 | 9/1968 | Switzerland | 212/221 |
| 709509 | 1/1980 | U.S.S.R. | 212/213 |
| 965968 | 10/1982 | U.S.S.R. | 212/221 |
| 1062173 | 12/1983 | U.S.S.R. | 212/213 |

Primary Examiner—Robert J. Spar
Assistant Examiner—Jennifer L. Doyle
Attorney, Agent, or Firm—Cushman, Darby & Cushman

[57] ABSTRACT

For the mounting of remote control apparatuses and loads in spaces which cannot be traversed, as for example, hot cells in industrial nuclear plants, an apparatus which is able to mount great loads and also manipulating apparatuses in such manner that only small forces and moments are supported in the resting position and in manipulation. is provided which consists essentially of a crane bridge having a crane carriage thereon and on a shaft there is mounted a crane hook roll. This shaft is connected with the crane bridge by cables and one or more telescopic arms connected to one or more travelling carriages.

3 Claims, 4 Drawing Sheets

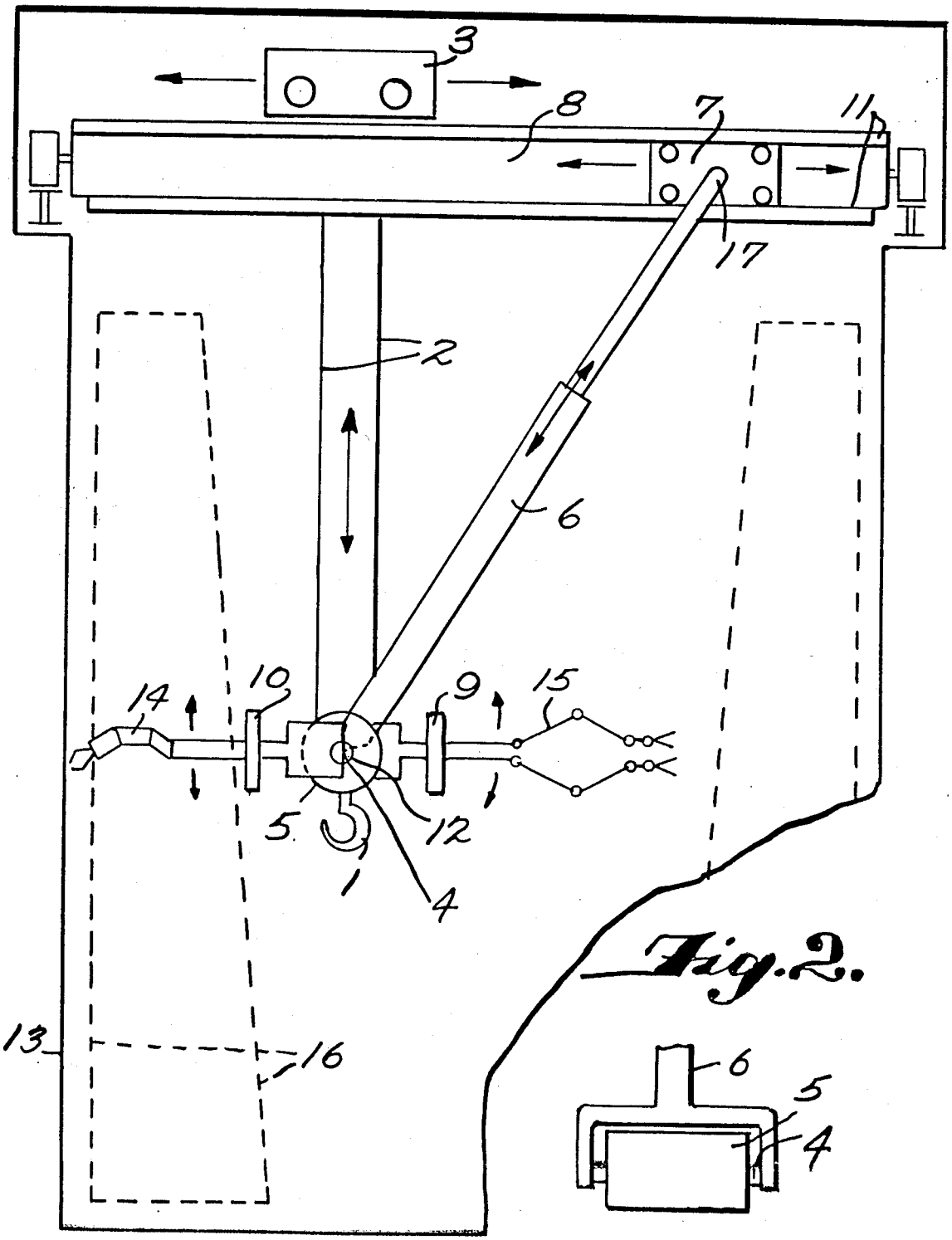

DEVICE FOR MOUNTING OF REMOTE CONTROL APPARATUSES

This is a continuation-in-part of application Ser. No. 924,159, filed Oct. 27, 1986, which was abandoned upon the filing hereof, which is, in turn, a continuation of application Ser. No. 871,133, filed on June 2, 1986, now abandoned, which is, in turn, a continuation of application Ser. No. 770,373, filed Aug. 29, 1985, now abandoned, which is, in turn, a continuation of application Ser. No. 422,179, filed on Sept. 23, 1982, now abandoned.

BACKGROUND OF THE INVENTION

1. Field of the Invention

The subject matter of the present invention is an apparatus for mounting remote control apparatuses and tools as well as for the remote control manipulation of loads in spaces which cannot be traversed by people, especially in dangerous areas of industrial nuclear plants. The apparatus includes a crane bridge having a crane carriage. Also, there is mounted on a shaft a crane hook roll. In a given case a crane hook can be fitted on the crane hook roll.

2. Description of the Related Art

The remote controlled operations in nontraversible spaces, that is, one which, due to high radiation, would be dangerous for humans, require an adaptation of the operating apparatus used for particular conditions. There must be considered that every manipulation under hot cell conditions besides is very difficult and time consuming, whereby the operator is burdened by the difficult handling conditions.

The problem of handling large loads in the so-called hot cells of industrial nuclear plants with optimum utilization of the valuable cell volume at present is basically not satisfactorily solved.

The previously available manipulating devices, as a rule, are separately constructed according to the requirements either as a manipulation device or as load mounting devices.

Other objects, features and characteristics of the present invention, as well as the method of operation and functions of the related elements of the structure, and to the combination of parts and economies of manufacture, will become apparent upon consideration of the following description in the appended claims with reference to the accompanying drawings, all of which form a part of this specification, wherein like reference numerals designate corresponding parts in the various figures.

Thus at the present time on the one hand with the help of manipulation apparatuses, there cannot be handled large loads and on the other hand, with load mounting devices to only a very limited extent can there be carried out difficult manipulation processes.

Therefore with the previous apparatuses and known concepts there are limitations in the manipulation range and in the manipulation of loads. Since an increase of the carrier load positively leads to massive and therefore clumsy constructions, disadvantageous construction compromises are inevitable.

Thus with bridges or ground connected vertical telescopes having horizontal cross bars there must be taken up all of the forces and moments of the telescopes, linkages, and guiding devices occurring in the rest position and during the manipulation, which increases the wear and likelihood of frequent repair. With bridge guided and simultaneously ground supported guides having horizontal cross bars the vertically displaceable guide device must receive the corresponding forces and moments and transfer them to the vertically arranged guide. Oscillating possibilities of the horizontal telescope are restricted in the bridge travel direction.

Therefore the present invention is based on the objects of providing an apparatus for mounting remote control apparatuses and tools as well as for remote controlled manipulation of loads in spaces which cannot be traversed by people, especially in hot cells of industrial nuclear plants. The apparatus includes a crane bridge having a crane carriage and thereon mounted on a shaft, a crane hook roll which can take up great loads and manipulation apparatuses in such manner that in the resting position and in remote controlled manipulating processes there are only sustained relatively small forces or moments which simultaneously permit a great utilization of the non-traversible space. This arrangement is easily repaired.

SUMMARY OF THE INVENTION

This problem was solved according to the invention by flexibly connecting the shaft of the crane hook roll by one or more telescopic arms via one or more travelling carriages with the crane bridge and furthermore by securing on the shaft one or more adjustable mountings for manipulation apparatuses connected with the telescopic arms.

Advantageously the shaft of the crane hook roll is flexibly connected by means of two telescopic arms via two crane carriages with the crane bridge through which there is attained a better load distribution on the crane bridge and the crane hook roll.

Furthermore, it is especially favorable if the telescopic arm is constructed in a forked shaped manner at the lower part in an area adjacent to; the crane hook roll and the shaft of the crane hook roll is located within the fork shaped construction.

BRIEF DESCRIPTION OF THE DRAWING

FIG. 1 of the drawing is a schematic representation of an illustrative apparatus of the invention.

FIG. 2 is a side view of an arm connection;

DETAILED DESCRIPTION

Figure 3:
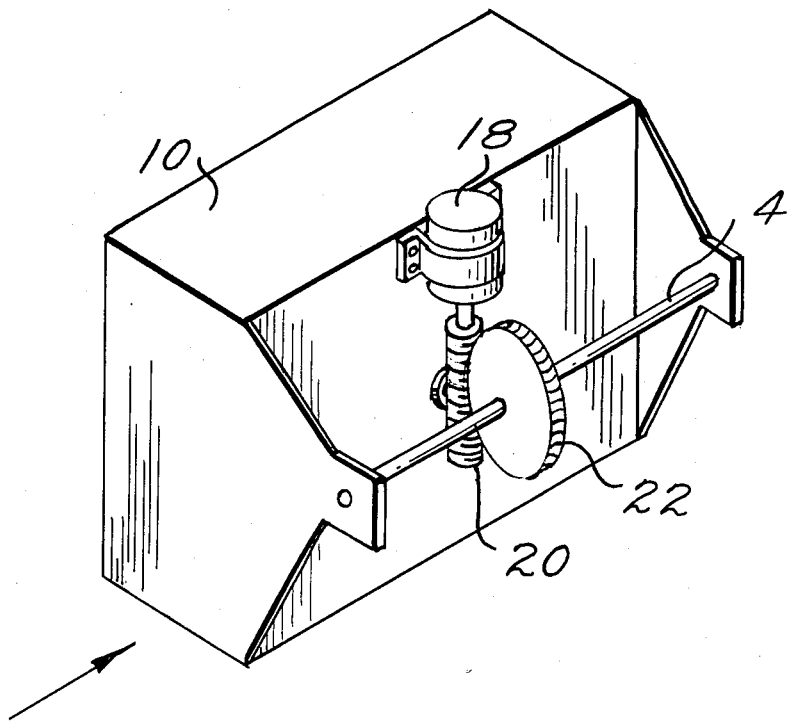
FIG. 3 is a perspective view of the pivot bearing in the embodiment of FIG. 1.

The invention will be described in more detail in connection with the drawing.

There are arranged in a hot cell 13 on both sides mounting places 16 for process components, such as for example, vessels, pumps, tubes, or valves. These process components must be manipulated within this hot cell 13, that is, taken up, moved, mounted, and repaired. For this purpose, there is located in the hot cell 13 a crane bridge 8, which for example includes two crane carriers 11. The crane bridge 8 carries a crane carriage 3 which is moveable over the full width of the hot cell 13, and guided travelling carriage 7 on the upper part of carriers 11. The carriage 3 holds the actual load via supporting cables or chains 2 of variable length on one or more crane hook rolls 5 having shafts 4 and in a given case, crane hook 1. There are connected at the load bearing point defined by the shaft 4 of the crane hook roll 5 one or more adjustable mountings 9 and 10 for the attachment of manipulation apparatuses 14 and 15, audiovision devices and tools in each case controllable from outside of the hot cell 13. The manipulating apparatuses 14 and 15 can consist of electrical power and parallel manipulators which are employed in the hot cell 13 for maintenance, servicing and repair problems. The mountings 9 and 10 for the manipulating apparatuses 14 and 15 are swivelable around the shaft 4 of the crane hook roll 5 independent of each other. In remote control operation in the hot cell 13 the load bearing point defined by the shaft 4 of the crane hook roll 5 is so moved through movement of the crane bridge 8 mounted on rollers at each end thereof and the crane carriage 3 as well as through change of the length of the carrier cable or chain 2 relative to the mounting place 16 that with the help of the crane hook 1 or the apparatuses 14 and 15 there can be carried out the necessary work in the area needing manipulation. The manipulation area of the apparatus of the invention especially includes the bottom and walls of the hot cell 13. It also makes possible repair operations on the crane bridge 8, on the carriage 3 and on the travelling carriage 7.

Moments occur on the shaft 4 of the crane roll 5 because of the manipulating apparatus 14, 15 and because of the manipulative process. The moments occurring on the shaft 4 of the crane roll 5 are transmitted by one or more multimembered telescopic arms 6 and the guided travelling carriage 7 and delivered to the crane bridge 8 as shown in FIG. 3A. For this purpose the mountings 9 and 10 are connected with the pair of telescopic arms 6, one on each side of the bridge 8, for example via the pivot bearing 12, which telescopic arms 6 are also connected via pivot bearing 17 with the carrier guided travelling carriage 7, only one being shown, the other being identical. The telescopic arms 6 are designed so that bearing pressure distribution and correction of moments occurring at each point of the hot cell 13 are possible. The telescopic arms 6 and the guided travelling carriage 7 can be stopped. Particularly favorable for taking up moments occurring in the resting position and during manipulation are the following developments of the invention relative to the construction of carriage 3, crane hook roll 5, telescopic arms 6 as well as the guided travelling carriage 7.

The shaft 4 of the crane hook roll 5 is connected via two telescopic arms 6 with two separated guided travelling carriages 7 which are guided on carrier 11 within the crane bridge 8 in such manner that the crane hook roll 5 is arranged between the telescopic arms 6. The guided travelling carriage 7 stays when braked at any position of the carriage 3 and therewith the shaft 4 or crane hook roll 5 is moveable with the arms 6 over the entire width of the crane bridge 8. Therefore the forces occurring are minimized. Besides the shaft 4 can be so connected with the crane bridge 8 through the two telescopic arms 6 via the guided travelling carriage 7 that the telescopic arms 6 are arranged with the crane hook roll 5 between them. Thus, the movement of the guided travelling carriage 7 at any position of the carriage 3 is not confined over the full width of the crane bridge 8. That is, the carriage 7 can move over the length of bridge 8 without interference with the cables 2. Forces occurring are minimized. In a further development of the invention which is advantageous in many cases the shaft 4 is so connected via a guided travelling carriage 7 and the crane bridge 8 with a telescopic arm 6 forkedly constructed (FIG. 2) in the lower region that the crane hook roll 5 is arranged on the shaft 4 within the forked construction. The movement of the guided travelling carriage 7 then is limited to one side up to the position of the carriage 3.

Figure 3A:
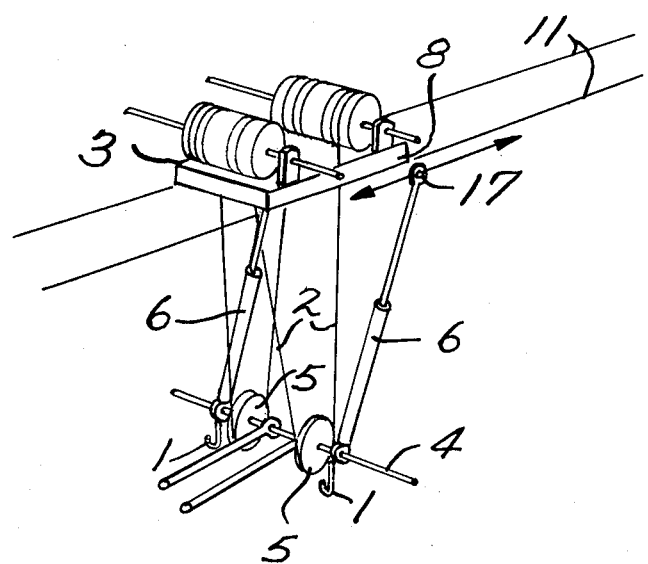
FIG. 3A shows a perspective view of an arrangement of a crane carriage, crane hook rolls, telescoping arms and guided travelling carriages.

As shown in FIGS. 3 and 3A, the moments acting on the crane through the manipulation apparatuses 14, 15 or the crane hook 5 may be counteracted by a torque that is imparted to the shaft 4 by a motor 18. Torque from electrical motor 18 is transmitted to the shaft 4 by a worm 20 that mates with a worm wheel 22 attached to the shaft. In this way, the torque generated by the motor is applied through telescoping arm 6 to crane bridge 8 in order to balance any countervailing moments caused by normal crane operation.

Figure 4:
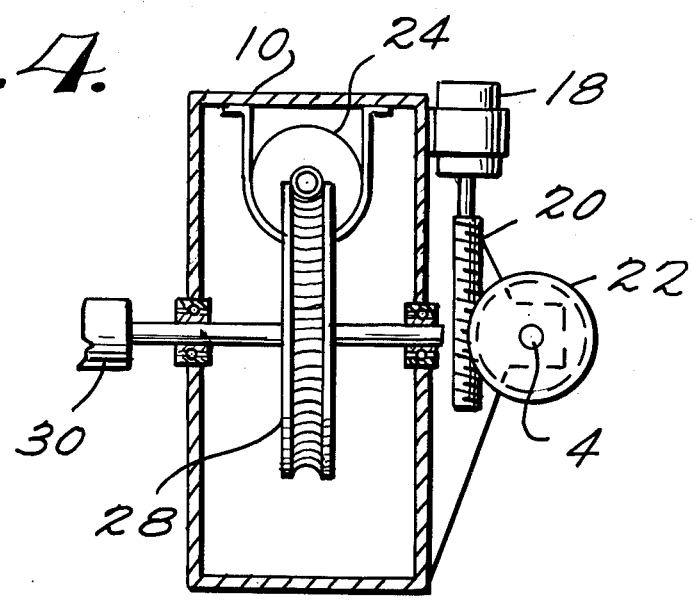
FIG. 4 is a cross sectional view taken along lines 4—4 in FIG. 1.

FIG. 4 represents a cross section taken along lines 4—4 in FIG. 1. A motor 24 is illustrated which is to provide power for turning the manipulation apparatus 14. Torque from motor 24 is transferred through worm 26 and worm wheel 28 to the shaft 30 leading to the manipulation apparatus, which turns the manipulation apparatus. The motor shaft may be locked in a particular position by an internal locking mechanism, or by controlling the current that is applied to the motor.

Figure 5:
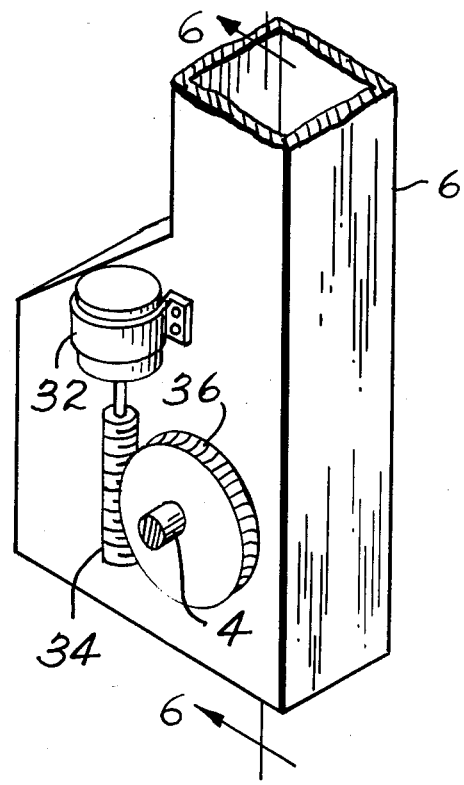
FIG. 5 illustrates an alternative embodiment for counteracting the moments produced by the operation of the crane.
Figure 6:
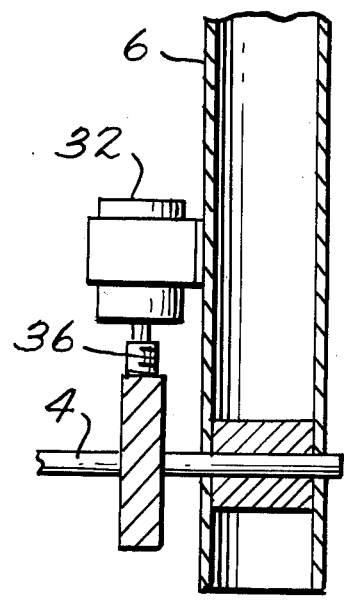
FIG. 6 is a cross sectional view taken along lines 6—6 in FIG. 5.

FIG. 5 illustrates a second embodiment of the present invention that utilizes a motor 32 which transmits torque to the shaft 4 through a worm 34 and worm wheel 36, which is connected to the shaft. In this embodiment, the motor is mounted on a lower end of telescoping shaft 6 rather than on one of the adjustable mountings 9, 10. The apparatus operates in the same way as the embodiment of FIGS. 1–4, with relative torque being generated between the mountings and telescoping arm. In this way, torque created by the manipulation arm is balanced by an equal and opposite torque applied through the telescoping shaft 6, when the motor is locked. FIG. 6 illustrates the embodiment of FIG. 5 in cross section.

Figure 7:
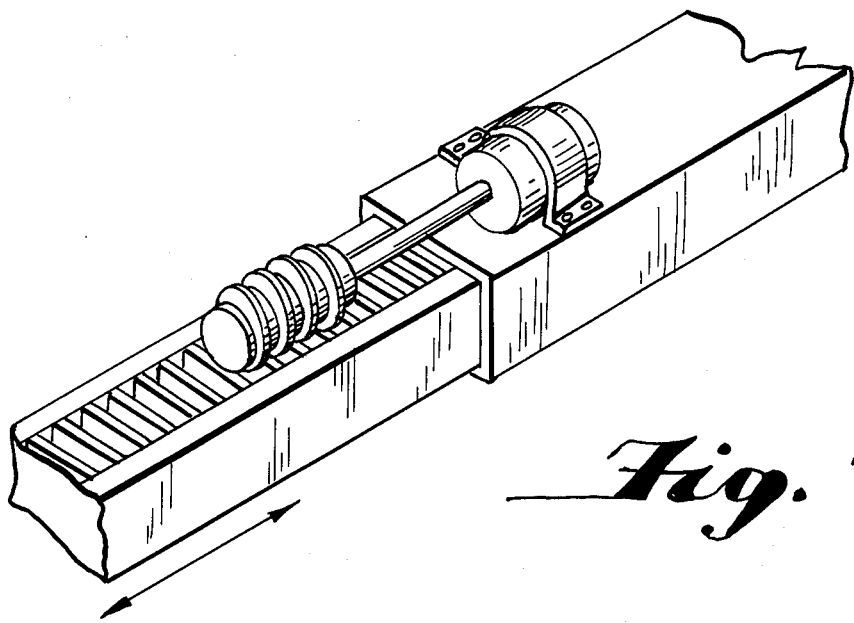
FIG. 7 illustrates in perspective a third embodiment for counteracting the moments produced during operation of the crane.

A third embodiment of the present invention is depicted in FIG. 7, wherein the moments generated by operation of the crane are cancelled by controlling the extension of a telescoping arm 6. This is achieved by a motor 38 that drives a worm 40. Worm 40 meets with a rack gear 42 and thereby controls the extension of the telescoping arm 6. Extension and contraction of arm 6 can be used to control both the position of the crane and to balance moments that are generated during crane operation.

The control of movement of the load receiving point defined by the shaft 4 of the crane hook roll 5 takes place via a coordination of movement of the carriages 3, the length of the supporting cables or chains 2, the position of the guided travelling carriage 7 and the length of the telescopic arms 6 so that degrees of free movement in each case are optimally utilizable.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An apparatus suitable for mounting of remote control apparatus and tools as well as for remote controlled manipulating of loads in spaces which are hazardous for humans, especially in hot cells of industrial nuclear plants, comprising:
   a crane bridge,
   a crane carriage movably and guidedly mounted on top of the crane bridge,
   a shaft having a crane hook roll thereon,
   cable means suspending said shaft from said crane carriage,
   a travelling carriage movably and guidedly mounted on a side of said crane bridge,
   at least one telescopic arm having one end connected to the travelling carriage, the opposite end of said telescopic arm being connected to said shaft,
   a manipulating device, and
   at least one movable mounting means for carrying the manipulating device, said movable mounting means being connected through said shaft with said telescopic arm.

2. An apparatus according to claim 1 wherein the shaft is connected by means of two telescopic arms via two guided travelling carriages with the crane bridge.

3. An apparatus according to claim 1 wherein the telescopic arm is of forked construction in the region of the crane hook roll and the shaft is located within this forked construction.

* * * * *